Nov. 24, 1936. R. G. JACKSON Re. 20,182

DECORATIVE SHEET MATERIAL AND PROCESS FOR PREPARING THE SAME

Original Filed Sept. 20, 1932

Inventor.

Ralph G. Jackson.

By Stone, Boyden & Frack.
Attorneys.

Reissued Nov. 24, 1936 Re. 20,182

UNITED STATES PATENT OFFICE 20,182

DECORATIVE SHEET MATERIAL AND PROCESS FOR PREPARING THE SAME

Ralph G. Jackson, Woodbury, N. J.

Original No. 1,998,780, dated April 23, 1935, Serial No. 634,057, September 20, 1932. Renewed December 18, 1934. Application for reissue June 29, 1936, Serial No. 88,034

26 Claims. (Cl. 91—67.9)

This invention relates to an article of manufacture and to a process of preparing the same and pertains more particularly to improvements in the production of nap-surfaced decorative sheet materials to be employed in floor coverings, wall coverings and in decorative sheet materials generally.

The present application is a continuation in part of my application, Serial No. 541,668, filed June 2, 1931.

In the present improvement, unexpected and remarkable effects in appearance and wearing quality have been obtained by using as a decorative sheet, a new type of felt sheet peculiar in that it has what may be defined as curled or kinky vegetable fibers of wood pulp. One such product now available is known as "Krafelt" and is identified and described generally in British Patent No. 313,085, although perhaps insufficiently therein and for which reason there will be embodied in this specification a short statement as to how the felt sheet is prepared prior to being treated decoratively and completed according to the present invention. The manufacture of the felted sheet, per se, is not claimed as a part of the present invention, but the resultant sheet and the steps of preparing it are peculiarly related to the resultant success achieved by the present invention, as will be shown.

One characteristic appearance of the floor coverings made by this invention from the curly fiber type of sheet is the obtainable velvety texture of the surface which has an actual nap surface when the sheet is treated as prescribed herein. It has also been found that the final decorated and completed product is wear resisting, and will wear smoothly and uniformly with even texture and is highly resistant to tearing strains.

Certain additional peculiar advantages are obtained as a result of using the type of absorbent felt base described and in treating in the manner explained herein. There appear to be at least two outstanding characteristics of the felted pulp fibers. One is the curled condition of the fibers and the other is the swelling of the fibers. Due to the fact that the fibers are swollen, they make a more open felt than previously known; also paints and dyes penetrate better than they do in providing similar treatment to other sheets, and also due to the fact that the fibers are curled and hooked and matted together, the dyes or inks, although they may follow the fiber, do not spread out laterally so far as they would on fibrous material heretofore known. For this reason, more definite lines may be formed in the resultant product by printing or otherwise applying decorations. The printed or colored lines are smoother on the edges due to the fact that the fibers are curled and do not extend so far in any direction into the sheet but provide strength by interlocking with each other due to the shape of each fiber. In this type of sheet, the surface may be roughened, that is, the nap may be raised, mechanically, after the sheet has been made. Due to the formation of the sheet, the fibers after being raised are hooked and matted together and do not loosen in such a way that they might tend to be lost from the sheet.

The above and other advantages and features of the invention are described and claimed in the following specification and claims and the structure is illustrated in the accompanying drawing, in which:—

Figure 1:
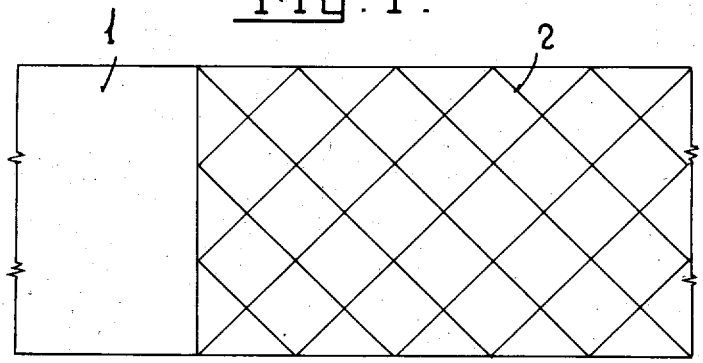
Figure 1 represents diagrammatically a top plan view of a section of decorative sheet material showing a portion which is decorated with relatively fine lines forming a conventional geometric design.
Figure 2:
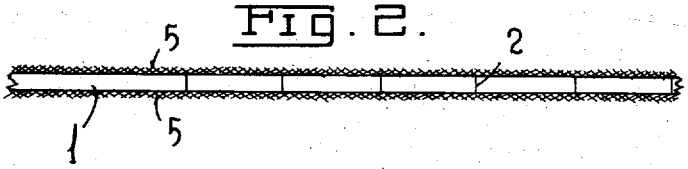
Figure 2 is an edge view of the sheet shown in Figure 1, illustrating the decorating material extending in lines downward through the material of the sheet having a nap surface on both sides.
Figure 3:
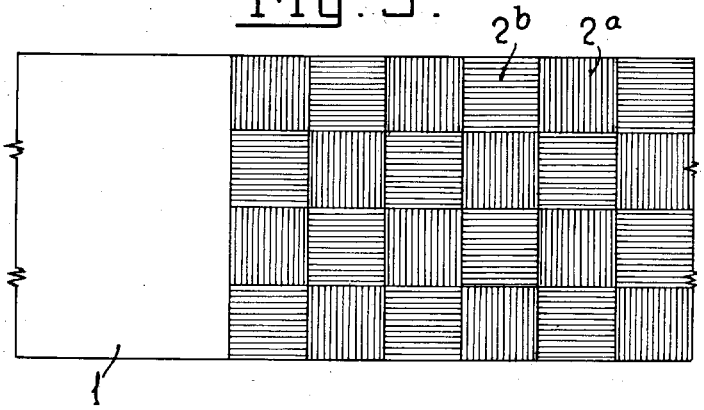
Figure 3 is a view similar to that shown in Figure 1, but showing a modification of the coloring scheme, displaying solid colors arranged in squares.
Figure 4:
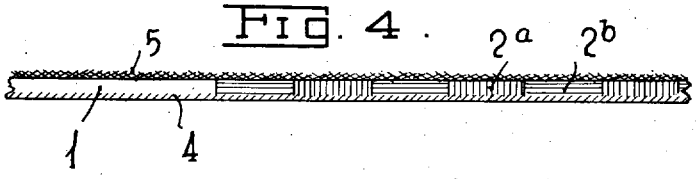
Figure 4 is an edge view of the sheet shown in Figure 3, showing an example wherein one side of the sheet has a nap surface and the other side has been treated with a stiffening material.

Referring in detail to the several figures of the drawing, 1 indicates a sheet of unsaturated absorbent mechanically or chemically treated wood pulp having a kinky or curly fiber, and prepared as hereinafter described. 2 indicates a decorative penetrating coloring material which extends well down into, substantially through, the thickness of the sheet from top to bottom. This may be applied in lines of different color, as indicated in Figures 1 and 2, or it may be applied in solid colors, as indicated by Figures 3 and 4, in which the parts $2^a$ represent red, for instance, and the parts $2^b$ represent blue, thus simulating a tile effect. This coloring effect may be worked out as desired, as for instance, in alternate squares of black and white. Instead of the geometric figures illustrated in the drawing, the decorations may be of any design.

The material of the colors and decorative effects ordinarily extend substantially through the thickness of the sheet, as shown in Figure 2, following the individual fibers. In Figure 4, however, is shown a sheet whereon a paint backing has been applied at 4. The paint backing is of plain color and is so applied that the oil or vehicle of the backing extends only a slight distance into the sheet, as shown, and the paint is of such a consistency that the pigment is not carried to any perceptible amount into the sheet. Instead of the paint backing, a backing containing rubber, or a composition of oil and cork, may be applied.

In Figure 2, the sheet 1 is shown provided with a nap 5 on both sides thereof and in Figure 4 with a nap on one side. The color decorations in the body of the sheet are preferably included in the nap as shown. However, the stiffening material 4 is preferably a composition which provides a uniform color and the color decorations in the sheet are not visible on the side treated with the stiffening material. A sheet having decorations throughout its thickness and having a nap on both sides with the decorations included in the nap may be made reversible. The decorations may be the same on both sides or the designs may be different if the degree of penetration of the decorative medium be controlled with respect to the thickness of the sheet, coloring penetrating from the opposite faces toward the center only about one-half the thickness of the sheet.

The degree of penetration and impregnation of the penetrating coloring material depends on the density and absorbability of the fibrous base, the thickness of the sheet, the amount of pressure used when the coloring material is employed and on the amount of and the degree of fluidity of the coloring material.

After the decorative media have been applied and allowed to dry, the sheet may be treated if desired with a waterproofing saturant such as a solution containing a cellulose ester, or containing resins and waxes, which partly or completely fill the remaining voids between the fibers. This is done particularly if the sheet is to be used for floor covering purposes to render the material more wear resisting as taught in my copending application, Serial No. 541,668. If a relatively soft sheet is desired, less saturant is forced into the sheet than if a harder or tougher sheet is to be formed. It is contemplated that the saturant may be substantially transparent as in the case of the invention described in my copending application Serial No. 541,668, of which this case is a continuation in part.

In the procedure of saturating the sheet, or as mentioned above, forcing saturant into the sheet, the following general treatment has been used to advantage. The sheet to be saturated is passed through a hot bath of saturant at a temperature of at least 300° F. In the preferred arrangement, the sheet is passed over a series of rollers, a plurality of which are located in the bath and a plurality above the bath. In travelling over these rollers the sheet is successively dipped, and a certain amount of air is squeezed out of the sheet as it passes over both the upper and lower rollers and at the same time a portion of liquid saturant is squeezed into the sheet by being caught between the travelling sheet and the roller over which it passes. The same squeezing action is responsible for driving out a portion of the air. The tension on the sheet and resultant pressure of the sheet on the rolls may, to some extent, control the degree of saturation and such degree is further controlled by the number of times that the sheet is dipped into the saturant. It will be obvious that the degree of saturation is less if the sheet is passed over three rolls submerged in the saturant than if it was passed over six rolls submerged in the saturant.

In the softer sheets, the saturant does not completely fill the voids between the fibres, or the voids nearer the surface are not completely filled, or the voids may be fewer and fewer when proceeding from the surface toward the inner portions of the sheet, in which latter case the inner portions are relatively dense and the outer portions relatively soft and open. In the relatively harder sheets, the voids are more completely filled throughout the body of said sheets.

The application of the coloring matter may be done in several ways. The color may be deposited by a printing machine and in this way a figured decoration may be obtained or a continuous color coating applied, or the sheet may be passed between rollers and the paint applied to one or both surfaces and forced in by the squeezing action of the rollers. As an optional method, the fibers may be tinted at the beater stage after they have been subjected to the curling or kinking treatment, and just prior to the formation of them into the felt sheet.

In decorating the sheet, the amount of paint applied and the proportion of pigment and vehicle are controlled, so that only the quantity is applied which will sink into the surface to cover the fibers and give them color, but still leave a soft surface having a nap, which may be raised mechanically as by applying rollers provided with wire bristles after the sheet is made. In painting a surface where a nap is to be raised, from 30% to 50% of the vehicle used in the paint will be volatile. In ordinary printing, such as is done on a hard surface, only from 5% to 15% of the vehicle is volatile matter. If paints of such low volatility were used here, the nap or figures would be so matted down that a hard surface material would be produced.

As a backing or stiffening material, a coat of paint may be employed in order to give the back a uniform color, or a backing might be used containing rubber, or containing a composition of oil and cork. The backing with paint may in many instances be done advantageously before the felt sheet is saturated or decorated. It has been found that by putting a coat of paint on the one side of the sheet when it is finished and allowing the oils or vehicle of this backing to slightly penetrate the sheet, the sheet is stiffened and given a tough layer on one side which enables the sheet to be handled without wrinkling. The paint must be of such a consistency that the vehicle will penetrate the sheet to a slight degree but the pigment will not be carried to any perceptible amount into the sheet.

Another method of increasing the stiffness of the sheet and making it easier to handle is to prime it with a penetrating sizing material or a priming material such as an oil with a slight amount of resin in it. The oil may be a drying oil such as linseed oil, China wood oil, and the like. The resin may be either natural such as colophony, or artificial such as a resin of the phenol-aldehyde or glycerol-phthalic acid type. The sheet is moistened part or all the way through with the said sizing or priming material and the oil allowed to set or oxidize. This will bond the fibers slightly and so fix them that when the sheet is distorted they will not push out of place and leave a mark on the face of the sheet. The priming or sizing material may be placed in the beaters when the sheet is made or the sheet may be formed first and the fibers placed and then the priming or sizing material used to toughen the sheet. In using the priming or sizing material it is necessary to limit the quantity so that the voids of the sheet are not filled but an amount is applied simply sufficient to moisten the fibers and place them in a tacky and slightly stiffened condition. This can readily be done without decreasing the penetrating quality.

The amount of paint applied and the proportion of pigment and vehicle may be controlled so that only the quantity is applied which will sink into the sheet and leave only an amount on the surface or in sight on the surface to cover the fibers and give them color, but still have a soft surface having a nap. When the amount of coloring material is properly controlled, the sheet will be penetrated and yet there will not be enough left on the surface to make a continuous film. If desired the nap is raised mechanically after the sheet has been decorated or saturated or first decorated and then saturated. By treating both sides of the felt base in this manner, a piece of goods may be produced having a relatively soft appearing surface on both sides. Under proper conditions, no mechanical raising of the nap is required since the nap surface is retained even after decoration and saturation.

The method of manufacturing the non-woven fibrous sheet material composed of artificially crinkled fibers and forming the base material for the improved impregnated product of this invention is essentially as follows: Wood or other suitable fibrous cellulosic pulp, prepared by any suitable chemical process for producing pulp, is treated with a swelling agent under conditions of concentration and temperature such that the reactivity of the solution does not reach the stage required to bring about gelatinization of the cellulose. The swelling agent is washed out before the reaction has proceeded appreciably further than required to swell the fibers. The crinkled fibers are then made into a felt or paper by the usual paper-making steps. Among the various suitable swelling agents are zinc chloride, ferric chloride, various thiocyanates, cuprammonium solutions, etc., but preferably caustic alkali, and particularly sodium hydroxide in concentrations between 8% and 35%. If a caustic alkali other than sodium hydroxide is used these percentages represent an equivalent concentration of sodium hydroxide. While higher concentrations of caustic may be used it is not necessary or economical to go above 35%. While temperatures between −10° C. and +104° C. may be used in conducting the process, room temperature is the most desirable and convenient. In order to prevent a too drastic action of the caustic on the pulp and to prevent weight losses, the ratio of liquor to pulp should not rise too high. Thus excellent results are produced by using sodium hydroxide liquor in a proportion of from 4.5 to 7.4 parts by weight for one part of pulp. Since the proportion of liquor used in this present process is somewhat smaller than is used in other processes for treating cellulose, whether in the manufacture of pulp or in the treatment of finished pulp for the purpose of purifying it, the mixing of the pulp and liquor within the relatively short period permitted for contact between the pulp and caustic, is effected by means of an apparatus which squeezes the pulp without abrasive or other mechanical action which tends to break up the fiber. A suitable apparatus for this purpose is the usual kneading machine, or ordinary beater machine in which the beater roll is raised from about 3 mm. to 12 mm. above the bed plate. The time of treating generally only a matter of several seconds to 30 minutes, should not extend beyond the point at which a superficial gelatinization of the fibers takes place and must stop before there is any appreciable loss of fiber identity. To this end a stream of water is run into the mixing apparatus to wash out the caustic and to stop the reaction after a time not appreciably longer than required to completely distribute the caustic throughout the pulp.

The time of treatment is dependent for the most part upon the speed at which the caustic solution is distributed throughout the pulp and upon the temperature of the solution since caustic alkali solution, as pointed out in the mentioned application, becomes increasingly reactive as the temperature is lowered, and because of the increased tendency of the cellulose to dissolve in cold caustic the time of treatment must be shortened. With excellent mixing, as when a small quantity of pulp is stirred rapidly with a paddle into the caustic solution, thirty seconds is sufficient, even at a temperature as high as room temperature, i. e., 20° to 30° C. When large quantities of pulp are treated, it is not possible, however, to cause such rapid admixture of pulp and caustic in the mixing machine and the time of treatment is, therefore, somewhat longer, usually between 10 and 30 minutes. A practical method of determining the end point, the time at which the reaction between the caustic and fibers should be stopped, consists in dispersing the fibers in water after they have been washed free from caustic and then making a freeness test of the treated pulp. As will be understood by those skilled in the pulp art, the freeness of a pulp is measured by the time required for the water in a dispersion of pulp to drain off the pulp through a screen, a long draining time denoting a low freeness and a short draining time under the same conditions denoting a high freeness. Inasmuch as the highly absorbent crinkled fibers from which the base is made have a remarkably high freeness as compared to other pulps, the freeness value not only determines the end point referred to above but also serves to identify the product. Since this high freeness does not permit of measurement with sufficient accuracy by the methods conventionally used, it has been found necessary to express the freeness values in terms of a freeness testing method which requires a longer time in seconds for the water to drain from the pulp. The freeness is defined as the time in seconds for the water level of a dispersion of the pulp, at 25° C. containing 5 grams of 90% bone dry pulp in sufficient water to make 1000 cc. of pulp suspension, to drop 30 centimeters when the suspension is contained in a vertical glass tube $1\frac{13}{16}$ inches in diameter closed at the bottom with a circular brass wire screen 1–12 inches in diameter, 0.006 inch thick and having a mesh of 50 x 70. In conducting the test the lower end of the tube is provided with an extension which is filled with water to the level of the screen at the bottom of the tube so that the pulp in the tube will not deposit upon the screen until an orifice in the extension is opened permitting the water to flow down through the pulp deposited thereon.

The duration of the caustic treatment, under the particular conditions of temperature and concentration, should be such that the freeness as defined above is between certain limits. It should be pointed out, however, that it is unnecessary for the skilled operator to conduct such a freeness test to aid in carrying out the process or to identify the product, the experience gained through trial and error being sufficient to determine the duration of the treatment which seldom exceeds 30 minutes and is preferably no longer than required to uniformly distribute the caustic throughout the pulp.

The unusually high freeness of the pulp from which is made the base material for the new impregnated article of manufacture is shown by comparison with other pulps known to have a high freeness value. Thus the fibers of kraft pulp crinkled at 25° C. with 22% sodium hydroxide has a freeness of 26.4 seconds and when crinkled with 8% caustic had a freeness of 39.2 seconds whereas the same pulp without the crinkling treatment has a much slower freeness as evidenced by the 63.7 seconds found as its freeness value. Similarly, bleached sulfite pulp crinkled with 18% caustic has a freeness of 36.6 seconds whereas ordinary bleached sulfite without the crinkling treatment has a freeness of 105.8 seconds and the more porous specially purified bleached sulfite pulp without the crinkling treatment has a freeness of 80.8 seconds. A sample of blotter pulp tested had a freeness of 284 seconds.

After the crinkling process has been completed and the caustic removed from the pulp by washing, the pulp may be beaten, while dispersed in water, with a paper beating machine in order to improve the strength of the felted product. Although this treatment decreases the absorbency somewhat for impregnating materials when the treated fibers are in dried sheet form, the absorbency is nevertheless still considerably higher than usual absorbent papers with the added advantage of greatly increased strength. In this operation it is not desired to cut the fibers but merely to disperse them or to brush them out and hydrate them, and to cause the fibers to exhibit a frayed appearance under the microscope. As more fully disclosed hereinafter, the treated pulp may be impregnated directly, especially when the impregnating media is an aqueous dispersion, and the impregnating pulp then made into sheet form.

The crinkled fibers obtained by the described method of treating pulp with caustic and washing out the caustic after a short time, or these fibers after the mentioned beating in water, are deposited in the form of a sheet, as in known methods of manufacturing paper, and the sheet is thereupon dried. The exceptionally high porosity of the resulting product may be noted from the fact that the porosity, as determined by the Gurley densometer, varies from 0.4 second to 12 seconds as compared to blotting paper which seldom shows, by the same test, a porosity less than 40 seconds.

The crinkled fibers product as described, or the paper of felt produced therefrom, are characterized by a coloration test with zinc chloriodide. This test, taken in connection with other characteristics mentioned hereinafter, also serves to identify the new impregnated product. In making the test the pulp or paper is dispersed in 10 cc. distilled water in a test tube, and the water drained and expressed from the pulp by pressure to about 75% moisture. When this pulp is transferred to a test tube containing 5 cc. of zinc chloriodide solution at 20–25° C. and shaken until dispersed there is a prompt appearance of a blue color in the pulp which indicates that it has been treated with a sodium hydroxide solution of 7.5% to 35% concentration. Mixtures of treated and untreated fibers are recognized under the microscope after staining with zinc chloriodide solution. The color produced by the crinkled unbleached kraft pulps is almost black due to the brown color of the pulp. This test distinguishes from pulps made by the soda process with 8%–11% sodium hydroxide solution under high temperature and pressure but which have not received the additional sodium hydroxide treatment of the crinkling process described herein. Pulp made from the soda process and which has not been crinkled as described shows only a very slight coloration readily distinguished from the deeper color produced by the treated pulp.

One form of the highly porous sheet material above described may also be prepared by the method set forth in Patent 1,757,756, issued to George L. Schwartz, May 6, 1930, which consists in treating a felt or paper made from ordinary paper pulp with a swelling agent such as sodium hydroxide at a concentration of 2.5 to 8 mols per 100 mols of water for 15 to 20 seconds at a temperature between the freezing point and 20° C. higher, i. e., between −12° C. and +8° C. for sodium hydroxide, and washing out the gelatinizing or swelling agent at the completion of the reaction. It will be noted that when the absorbent felted product is made by treating paper instead of pulp, which is subsequently felted it is necessary to use a more reactive swelling agent, at the low temperature mentioned.

It is to be understood that the term artificially crinkled fibers, as used in the claims, refers to the curled and kinked product obtained as above described by the action of a swelling agent on fibers in pulp form which is washed out of the fibers after the short time required for completion of the desired reaction between the swelling agent and fibers, as distinguished from the fibers in paper which has been merely puffed by the treatment of paper as for instance by the means used in the previously mentioned patent which consists in crystallizing salts in a sheet of paper. The objects of the present invention cannot be obtained with products of this latter type.

The crinkled fibers from which the base of the new impregnated article is made is also to be distinguished from the fibers of pulp which have received a subsequent purifying treatment with caustic inasmuch as this treatment is extended as to time and is, furthermore, usually conducted under drastic conditions with respect to high liquor ratio and mechanical manipulation as are suitable for the production of high grade papers. The described crinkled product cannot be produced under these conditions.

It is preferable to employ in the present invention, the curly or kinky fibres of wood pulp as set forth above, but vegetable fibres such as cotton linters which are naturally curly may be employed in preparing a sheet suitable for use in my article, provided that a loose, absorbent sheet having a nap surface may be formed from such fibres.

The sheet material employed in the product of the present invention has numerous advantages. When coloring fluid in the form of paint or dye is applied to the surface of a "Krafelt" sheet it is rapidly absorbed and carried directly inward without spreading laterally to as great an extent as in the case of ordinary felt. Due to the curled fibers, there is practically no lateral spread of the coloring medium within the body of the sheet as well as at the surface so that uniformity of outline of the designs is obtained throughout the thickness of the sheet. This results in a manufacturing factor in which the penetration of the decorative material in this new material is as great and as uniform as the surface spread which is quite in contrast to what would result in surface application of coloring fluids to previously known papers or felts inasmuch that in the latter the surface spread is very much greater than the penetration and the surface markings much more irregular than in the case of the new sheet. This latter characteristic is probably due to the fact that in ordinary papers and felts, such as heretofore available, the fibers are usually matted or extended laterally thus causing applied color to run or be absorbed laterally with little penetration, whereas in the new product, due to the kinks and curls, the fibers extend inwardly of the sheet as much as laterally and color penetration is as pronounced as is lateral spread.

The texture of the sheet is also uniform throughout and does not change in its physical appearance as it is worn down. Also, the nap on the sheet may be retained even after the application of coloring fluids or saturants.

It has been observed that the rates of absorption of different coloring fluids by a given fibrous material are different. By employing "Krafelt" the differences in the rates of absorption for different coloring fluids are lessened. Due to the nature of the fibers in "Krafelt", the different coloring fluids employed may be absorbed at more nearly the same rate.

What I claim is:—

1. As a new article of manufacture, a felt sheet composed of chemically curled and swollen fibers of wood pulp, the said sheet having a nap and having colored decorations substantially throughout its thickness.

2. As a new article of manufacture, a felt sheet composed of chemically curled and swollen fibers of wood pulp, the said sheet having a nap and having decorations at one face and extending substantially throughout its thickness, the contour and colors of said decorations being uniform substantially through the sheet whereby the sheet has the same appearance when the sheet is worn as before wear sets in.

3. As a new article of manufacture, a decorated and waterproofed sheet material made from a felt base having curled cellulose fibers, and having a nap surface on both sides and having decorative coloring extending in designs into the body of the sheet.

4. As a new article of manufacture, a decorated felt base material composed of chemically kinked and curled cellulose fibers and having a raised nap surface on both sides thereof and said material having colored designs extending deeply into the body of the sheet thereof.

5. A process of preparing a decorative sheet material, which process comprises applying to a sheet composed of chemically curled and swollen fibers of wood pulp coloring fluid to provide decorations and to permit the fluid to become absorbed directly inwardly in the sheet and to substantially as great extent as laterally, drying the decorated sheets, and subjecting the decorated sheet to a mechanical napping treatment to provide a nap on the surface and thus not destroying the decorations when raising the nap.

6. A process of preparing a decorative sheet material, which process comprises absorbing coloring fluid with chemically curled and swollen fibers of wood pulp to form a decorative sheet having colored decorations which extend deeply into the sheet formed of said fibers, and subjecting the colored sheet to a mechanical napping treatment to provide a nap on the surface and thus not destroying the decorations when raising the nap.

7. A process of preparing a decorative sheet material, which process comprises applying to a sheet composed of chemically curled and swollen fibers of wood pulp coloring fluid to permit the absorption thereof deeply into the sheet in the form of colored designs, and subjecting the colored sheet to a mechanical napping treatment to provide a nap surface on both sides thereof and thus not destroying the decorations when raising the nap.

8. A process of preparing a decorative sheet material, which process comprises impregnating a sheet composed of chemically curled and swollen fibers of wood pulp, with a fluid composition for coating and stiffening the fibers, applying coloring fluid to the surface of the sheet to absorb the coloring and to decorate the sheet with colored designs well down into the body of the said sheet, and subjecting the decorated sheet to a mechanical napping treatment to provide a nap on the surface and thus not destroying the decorations when raising the nap.

9. A process of preparing a decorative sheet material, which process comprises applying to a sheet having a nap and composed of chemically curled and swollen fibers of wood pulp coloring fluid to decorate the sheet the operation being conducted without destroying the nap and to form colored designs that extend deeply into the sheet.

10. A process of preparing a decorative sheet material, which process comprises applying to a sheet composed of chemically curled and swollen fibers of wood pulp coloring fluid to decorate the sheet with colored designs that extend deeply into the body thereof, impregnating the decorated sheet with a saturant to fill the voids in the sheet, and subjecting the decorated sheet to a mechanical napping treatment to provide a nap on the surface and thus not destroying the decorations when raising the nap.

11. As a new article of manufacture, a decorated sheet material comprising curly cellulose fibers and a saturant in voids between the fibers, the said sheet material having a nap and having colored designs that extend deeply into the sheet.

12. As a new article of manufacture, a decorated felt base sheet material composed of chemically kinked and curled cellulose fibers and a saturant in voids between the fibers, the said sheet material having a raised nap surface on both sides thereof and having colored decorations that extend deeply into the said sheet material.

13. A process of producing a sheet suitable for use as a floor covering having a nap surface which process comprises applying penetrating coloring matter to a sheet of felt base material composed of felted curled and kinked cellulose fibers and forming figured decorations, and then mechanically raising the nap on the surface.

14. In a decorative sheeting, a fibrous sheet having colored designs extending deeply into the sheet, containing a saturant toughening agent filling the voids between the fibers and extending substantiallly completely therethrough, and having a nap surface.

15. In a decorative sheeting, a fibrous sheet having decorative coloring extending in designs deeply into the sheet, containing a saturant toughening agent filling the voids between the fibers and extending substantially completely therethrough, and having a nap surface.

16. A decorative covering comprising a sheet of fibrous material having decorative coloring extending from one face deeply into the body of the sheet, and having a toughening binding agent extending substantially throughout the thickness of the sheet and permitting the decorative coloring to be visible at the wear surface and on down into the sheet as it is worn independent of the color of the saturant, said sheet being pliable and resistant to abrasive and impact wear, and having a nap surface on that face displaying the decorative coloring.

17. A decorative covering comprising a sheet of fibrous material having decorative coloring in designs extending from one face deeply into the body of the sheet, and having a toughening binding agent extending substantially throughout the thickness of the sheet and permitting the decorative coloring to be visible, said sheet being pliable and resistant to abrasive and impact wear, and having a nap surface on that face displaying the decorative coloring.

18. As a new article of manufacture, a piece of sheet covering material having a base of felted curled cellulose fibers, and having a nap surface and figured decorations on one side and a stiffening composition on the other and extending within the body of said sheet material.

19. In a decorative sheeting, a sheet of non-woven fibrous material of a porous nature prior to treatment, having colored designs extending deeply into the sheet, containing a saturant toughening agent filling the voids between the fibers and extending substantially completely therethrough, and having a nap surface.

20. In a decorative sheeting, a sheet of non-woven fibrous material of a porous nature prior to treatment, having decorative coloring extending in designs deeply into the sheet, containing a saturant toughening agent filling the voids between the fibers and extending substantially completely therethrough, and having a nap surface.

21. A decorative covering comprising a sheet of non-woven fibrous material of a porous nature prior to treatment having decorative coloring extending from one face deeply into the body of the sheet, and having a toughening binding agent extending substantially throughout the thickness of the sheet and permitting the decorative coloring to be visible at the wear surface and on down into the sheet as it is worn independent of the color of the saturant, said sheet being pliable and resistant to abrasive and impact wear, and having a nap surface on that face displaying the decorative coloring.

22. A decorative sheet of the type having a nap surface on at least one face thereof consisting of a fibrous web having decorative coloring extending from one face thereof deep down into the web, and a substantially transparent toughening agent extending substantially through the thickness of the web, the pores of said web between the fibers within the body of the sheet being only partially filled, said decorative coloring being visible through the toughening agent.

23. A decorative sheet of the type having a nap surface on at least one face thereof, consisting of a fibrous web formed of curly cellulose fibers having decorative coloring extending from one face thereof deep down into the web, and a substantially transparent toughening agent extending substantially through the thickness of the web, the pores of said web between the fibers within the body of the sheet being only partially filled, said decorative coloring being visible through the toughening agent.

24. A decorative sheet consisting of a fibrous web having decorative coloring extending from one face thereof deep down into the web, and a substantially transparent toughening agent extending substantially through the thickness of the web, the pores of said web between the fibers within the body of the sheet being only partially filled, the decorated and saturated sheet having a nap surface, said decorative coloring being visible through the toughening agent.

25. The process of preparing a soft-bodied decorative sheet of the type having a nap surface on at least one face thereof from porous fibrous sheet material, which process comprises impregnating such a sheet with decorative coloring matter penetratingly so as to extend deep down into the body of the sheet and tint the fibers without filling the spaces between the fibers, subsequently impregnating the sheet thus decorated with a saturant toughening agent substantially throughout the thickness of a sheet and terminating the introduction of the toughening agent before the voids between the fibers within the body of the sheet and at the surface are completely filled.

26. The process of preparing a soft-bodied decorative sheet of the type having a nap surface on at least one face thereof from porous fibrous sheet material, which process comprises impregnating such a sheet with decorative coloring matter penetratingly so as to extend deep down into the body of the sheet and tint the fibers without filling the spaces between the fibers, subsequently impregnating the sheet thus decorated with a hot saturant toughening agent substantially throughout the thickness of a sheet and terminating the introduction of the toughening agent while yet the voids between the fibers within the body of the sheet and at the surface are capable of accepting an additional amount of saturant.

RALPH G. JACKSON.